Patented Dec. 4, 1928.

1,693,947

UNITED STATES PATENT OFFICE.

JOHN N. CAROTHERS AND CHARLES F. BOOTH, OF ANNISTON, ALABAMA, ASSIGNORS TO FEDERAL PHOSPHORUS COMPANY, OF BIRMINGHAM, ALABAMA, A CORPORATION OF ALABAMA.

METHOD OF PRODUCTION OF SODIUM BISULPHATE.

No Drawing.    Application filed December 31, 1925    Serial No. 78,696.

This invention relates to a method of commercial preparation of a uniform composition liquid sodium bi-sulphate, and its subsequent solidification.

The object of the invention is to obtain solid sodium bi-sulphate, of a uniform composition and high grade, that is to say having as high as 85% bi-sulphate, and in a suitable form for convenient handling and use.

It has been the general practice heretofore, to use crude ground niter cake as a source of sodium bi-sulphate, and for many purposes this is a satisfactory source and form of bi-sulphate. For uses of bi-sulphate where a uniform and high percentage bi-sulphate content is desired, niter cake is not suitable, because it lacks the necessary uniformity and high percentage of bi-sulphate. We have found by examination of a great many samples of niter cake from many different producers, that the composition varies from 60% $NaHSO_4$ to 84% $NaHSO_4$. We have also found a variation of the percentage $NaHSO_4$ from individual producers of niter cake. In all our investigation we have not found any niter cake having any more than 84% bi-sulphate, and none having a dependably uniform composition.

Niter cake in this crude and impure form of bi-sulphate is obtained as a by-product in the manufacture of nitric acid where sulphuric acid reacts with sodium nitrate. The sodium bi-sulphate content of such material is irregular, and varies from batch to batch. The principal impurities most commonly present are iron and aluminum compounds, with sodium sulphate ($Na_2SO_4$) as the principal diluent. In uses where a uniform composition of bi-sulphate of high percentage is desired, it is not convenient or practicable to use niter cake as the source of bi-sulphate as it is commonly produced in the manufacture of nitric acid; because the sodium bi-sulphate content is too low, and too irregular in percentage.

In our invention we propose the production of a uniform material containing approximately a constant percentage of sodium bi-sulphate, of a higher percentage than may be regularly obtained in niter cake or any other commercial source. We propose accomplishing this in either of two ways:

1. Treatment of sulphuric acid with soda ash,

2. Treatment of low grade niter cake with sulphuric acid.

In proceeding with our process where soda ash and sulphuric acid is used, the following will serve as an example: to 40.8 lbs. of soda ash containing 58% $Na_2O$, add 77.6 lbs. of 66° Bé. sulphuric acid. When bi-sulphate is produced from low grade niter cake the detailed procedure of the process will vary according to the bi-sulphate content in the niter cake. Taking as an illustration a niter cake having 75% $NaHSO_4$, 23% $Na_2SO_4$, and 2% $H_2O$, to produce a material containing 85% $NaHSO_4$, 4% $Na_2SO_4$, 11% $H_2O$, we use 100 lbs. crude niter cake, 13.5 lbs. 66° Bé. sulphuric acid, and 10 lbs. water. It is possible to use other sulphuric acid than 66° Bé.; however, in such cases it will be necessary to evaporate water. When we refer to strong sulphuric acid we mean an acid of such strength that it will not be necessary to introduce an evaporation step prior to cooling or spraying the resultant liquid bi-sulphate. The mixing of the component materials is accomplished by breaking up the lumps of crude low grade niter cake into pieces of convenient size for handling, and adding the materials in the proportions mentioned above, to a tank or vat equipped with suitable means of heating. The order of additions are preferably; add the water and then the acid, and finally the niter cake. The resultant mixture will contain approximately 59% $SO_3$, and when 1 gram is diluted with water and titrated with a half-normal base 14.2 cc. of the half-normal solution will be required for neutralization, using methyl orange as an indicator. The bi-sulphate when prepared in the proportions outlined above should be heated in the tank or vat to approximately 150° C. to effect complete solution and reaction. The temperature of initial solidification of this mix is approximately 130° C. Complete solidification is at a temperature somewhat lower than 130° C., and therefore for complete solidification somewhat lower temperatures are necessary. A chemical analysis of the solidified product shows it actually contains approximately 85% $NaHSO_4$; and repeated tests demonstrate the possibility of continuous production of such a uniform high percentage bi-sulphate content material when the described methods are followed.

After the bi-sulphate is prepared according to either of the foregoing methods, we may either run the liquid mass into vats or cooling pans where it will cool and solidify, after which it may be broken up and ground to the desired fineness; or we may spray the liquid by means of spray nozzles or a revolving disc into a stream of cold air which will cause the bi-sulphate to congeal or solidify into solid particles. Such spray systems as may be used for this purpose are those commonly used for ammonia salts, drying milk, eggs, dyestuffs, meat juices, and fruit juices where the liquid is sprayed into a stream of warm air. Another application of the spray principle is its use in congealing urea, for the purpose of obtaining small solid dry particles, in the form of hard glazed globules, of a hygroscopic substance which will have a greatly reduced tendency to absorb moisture as compared with such particles produced by grinding.

We prefer the use of the revolving disc spray as a means of forming a mist. As the mist falls through the stream of cold air each particle assumes something of a globular form and is congealed, so that a dry solid particle falls to the bottom of the spray chamber. When the dry solid particles of bi-sulphate are removed from the spray chamber they are ready for shipment or use for any desired purposes for which the bi-sulphate is commonly used, such as disinfectants.

Having thus described our invention, what we claim as new and desire to secure by Letters Patent, is:—

1. The herein described method of production of high grade sodium bi-sulphate, which consists in adding water and strong sulphuric acid to crude niter cake to yield a product containing approximately 85% bi-sulphate, heating the mixture to approximately 150° C., cooling to approximately atmospheric temperatures, and then disintegrating the resultant bi-sulphate, substantially as described.

2. The herein described method of production of high grade sodium bi-sulphate, which consists in adding sulphuric acid to niter cake until the bi-sulphate content is increased to approximately 85%, heating the mixture to approximately 150° C., cooling the heated mass to approximately atmospheric temperature, and suitably breaking and disintegrating the cooled mass substantially as described.

In testimony whereof we affix our signatures.

JOHN N. CAROTHERS.
CHARLES F. BOOTH.